C. WAGNER, Jr., AND G. P. SCHMIDT.
MEASURING APPARATUS.
APPLICATION FILED OCT. 23, 1919.
1,424,429.
Patented Aug. 1, 1922.
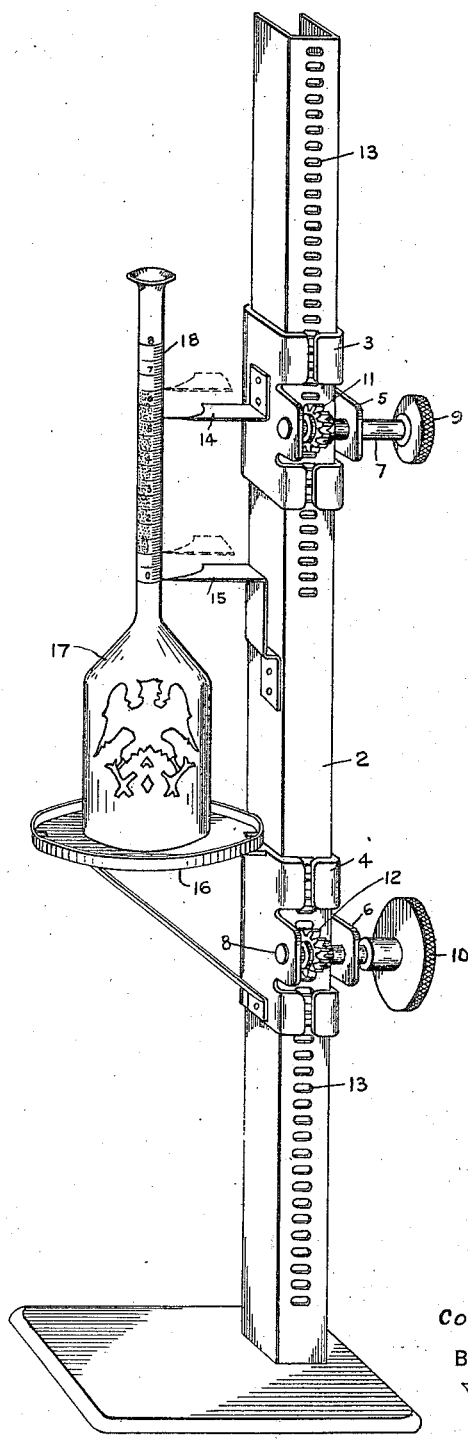
INVENTOR
Constantin Wagner, Jr
Godfrey P. Schmidt.
BY
ATTORNEY

UNITED STATES PATENT OFFICE.

CONSTANTIN WAGNER, JR., AND GODFREY P. SCHMIDT, OF NEW YORK, N. Y.; SAID SCHMIDT ASSIGNOR TO SAID WAGNER.

MEASURING APPARATUS.

1,424,429. Specification of Letters Patent. Patented Aug. 1, 1922.

Application filed October 23, 1919. Serial No. 332,582.

*To all whom it may concern:*

Be it known that we, CONSTANTIN WAGNER, Jr., and GODFREY P. SCHMIDT, citizens of the United States, both residing at New York city, in the county of Bronx and State of New York, have invented certain new and useful Improvements in Measuring Apparatus, of which the following is a specification, reference being had therein to the accompanying drawing.

Our invention relates to improvements in measuring apparatus and more particularly has reference to and is illustrated in the accompanying drawing in its application to an apparatus especially adapted for testing milk.

In the Babcock test for accurate and rapid determination of butter fat in milk and milk products such as cream, skim milk, buttermilk, cheese, etc., the substance to be tested is put into a glass bottle with a long graduated neck and sulfuric acid of proper strength is added to dissolve all the solids except the fat. The fat is then separated from the acid solution by whirling the bottle and its contents in a centrifugal machine, after which hot water is finally added to bring the separated fat into the graduated neck of the bottle and the percentage of fat is very rapidly read from the graduations upon the neck of the bottle. For reading the percentage of fat, dividers are opened to a distance corresponding to the length of the fatty portion as it appears in the neck of the bottle and one leg of the dividers is then applied at the zero point of the graduations, the other leg indicating a quantity of fat, but this is a slow and not always very accurate method for the reason that the dividers some time get out of adjustment before the second reading is taken, whereas according to our invention the use of dividers is unnecessary. After the bottle has been whirled in a centrifugal machine it is simply mounted upon an adjustable platform adjacent a pair of pointers upon a standard and the platform and one of the pointers is adjusted until the fatty matter is properly indicated, after which by readjustment of the apparatus without touching the bottle and without the use of dividers, a direct reading from zero can be had or the reading may be taken without the second adjustment.

In the accompanying drawing we have illustrated in perspective a suitable form of apparatus embodying an application of our invention.

1 indicates the base or table, 2 the standard which is preferably of a channel-shaped piece of metal as shown, and 3—4 indicate slidable members adapted to be raised or lowered upon the channel, from which it will be seen that by slightly expanding the channel, sufficient friction may be applied to retain said members 3—4 in any adjusted position. The slide members 3—4 are also provided with lugs such as 5—6 through which pins or spindles 7—8 provided with finger pieces such as 9—10 may be rotatably mounted and may be provided with pinions such as 11—12 for engaging the holes 13 in the channel standard as shown and from which it will be seen that by turning the finger pieces 9—10 clockwise the slides 3—4 will be raised, or either of them, and by rotating said finger pieces anticlockwise they or either of them will be lowered.

14—15 indicate suitable pointers, the former upon the slide 3, and the latter suitably secured to the standard 2 and 16 indicates a suitable table secured to the slide 4 as shown and upon which may be carried the bottle 17 provided with graduations such as 18.

Assuming now that the milk has been introduced into the bottle and has been treated with the sulfuric acid, whirled, and that the fatty matter has been raised in the neck of the bottle by the application of hot water, it might take the position between the graduations indicated as 1 to 6½ as indicated by the shading upon the neck of the bottle. By turning the finger piece leftwardly now until the pointer 15 indicates 1 on the graduations, and the pointer 14 indicates 6½ by turning the finger piece 9, the length of the column of fat in the neck of the bottle will be exactly equal to the separation of the pointers as indicated in dotted outline, so that by now raising the bottle 17 by turning the finger piece 10 clockwise until the pointer 15 is at zero, the finger 14 will indicate 5½ upon the graduated scale of the neck of the bottle showing the exact measure of fatty matter without the necessity of touching the bottle or using dividers, thus offering an absolutely accurate and certain means for measuring the exact quantity of fatty matter in the neck of the bottle.

Of course it will be understod that various modifications may be made in the construction and arrangement of parts without departing from the spirit of the invention as claimed.

We claim:

In an apparatus of the class described, a standard with a vertically adjustable table supported thereby, a fixed indicator upon said standard, and another indicator adjustable thereupon, said standard comprising a channel with perforations through the yoke thereof, and said adjustable indicator and a table each being provided with a housing, and a rotatable sprocket in each housing for engaging said perforations for raising and lowering said table and adjustable indicator.

In testimony whereof we hereunto affix our signatures in the presence of two witnesses.

CONSTANTIN WAGNER, Jr.
GODFREY P. SCHMIDT.

Witnesses:
ANNA F. DUFFY,
DAVID H. DOUGLASS.